United States Patent
Wernikoff

[15] 3,700,797

[45] Oct. 24, 1972

[54] FACSIMILE NOISE DELETION AND CODING SYSTEM

[72] Inventor: Robert E. Wernikoff, Belmont, Mass.

[73] Assignee: Electronic Image Systems Corporation, Cambridge, Mass.

[22] Filed: Dec. 31, 1969

[21] Appl. No.: 889,526

[52] U.S. Cl...................178/6, 178/DIG. 3, 178/26.5, 179/15 BY, 340/347 DD

[51] Int. Cl...............................................H04n 7/12

[58] Field of Search....178/6 BW, 26.5; 340/347 DD; 179/15 BY

[56] References Cited

UNITED STATES PATENTS

| | | | |
|---|---|---|---|
| 3,423,534 | 1/1969 | Pan | 179/15 BY |
| 3,292,086 | 12/1966 | Magnoski | 340/347 |
| 2,724,739 | 11/1955 | Harris | 178/26.5 |
| 2,911,463 | 11/1959 | Kretzmer | 178/DIG. 3 |
| 3,573,789 | 4/1971 | Sharp | 178/DIG. 3 |

*Primary Examiner*—Robert L. Griffin
*Assistant Examiner*—Joseph A. Orsino, Jr.
*Attorney*—Russell L. Root and Rines and Rines

[57] ABSTRACT

The disclosed circuit and method detect and delete certain pulse sequence patterns from a binary data stream. When used in a facsimile system to eliminate single pulses from a binary data stream derived by scanning graphic information on a document, the resolution of the scanning system and the size of the graphic information areas being such that two or more pulses in the binary data stream are required to represent the minimum normal elemental area of graphic information, the invention both reduces appreciably the number of pulse sequences required to be communicated and also helps to eliminate isolated noise marks from the facsimile copy.

14 Claims, 4 Drawing Figures

ROBERT E. WERNIKOFF
INVENTOR.
BY
ATTORNEY

ROBERT E. WERNIKOFF
INVENTOR.
BY
ATTORNEY

ROBERT E. WERNIKOFF

*INVENTOR.*

*BY* James E Hawes

ATTORNEY

FACSIMILE NOISE DELETION AND CODING SYSTEM

INTRODUCTION

The invention relates to a circuit and method for detecting and deleting certain pulse sequence patterns from a binary data stream. It is particularly useful in facsimile applications where the resulting pulse sequences may be coded for communication.

In many facsimile systems, a fine beam of light is used to scan, in a rectilinear grid pattern, a white document bearing black marks of graphic information. The light reflected from the document is used to produce an analog video signal whose amplitude variations correspond to the brightness or reflectivity variations of corresponding portions of the document. This multilevel video signal is then converted into a two level, binary signal by, for example, a circuit such as described in British Pat. no. 1,059,238 issued to Rank Xerox Limited and published Dec. 11, 1963. Because of the variations in the scanning light beam generation system, and because of dirt, smudges, and other extraneous matter born by the scanned document, and because of noise in the video signal producing and processing electronics, and as a result of various other transient factors, the binary signal derived from the video signal is likely to include, interspersed among the groups of binary pulses which correspond to the graphic information on the document, some extraneous pulses due to these transient factors. In prior facsimile systems, no attempt was made to identify and eliminate these extraneous pulses from the portions of the binary signal actually representative of graphic information on the scanned document. As a result, the facsimile copy produced by prior facsimile systems will include both a representation of the information on the scanned document and a representation of the extraneous noise introduced by the system. If the binary signal is coded before transmission, as is often preferred in facsimile applications, the extraneous pulses will increase unnecessarily the number of pulse sequences to be coded. Or put differently, if the extraneous noise pulses are identified and eliminated, the number of pulse sequences to be communicated can be reduced appreciably. These and other objects of the invention will be apparent from the detailed description of the preferred circuit and method.

BRIEF DESCRIPTION OF THE INVENTION

The invention contemplates examining successive groups of pulses in a sequence of binary pulses, or binary data stream, to detect and delete pulse groups within the examined sequence of less than a minimum number, the minimum number being related to characteristics of the graphic information normally found on a document. Preferably this process of detection and deletion is accomplished automatically for pulse groups of either binary value by a method and circuit which examines less than all of the pulses within each successive sequence. If the resultant pulse sequences are grouped, not according to runs as is often conventional in facsimile coding system, but into groups of equal numbers, then because certain pulse patterns have been deleted and can not occur it is possible to translate the groups into groups of fewer pulses. A method and circuit is disclosed for achieving such a coding of the message symbol sequence.

By appropriately scanning the graphic information, pulse groups representative of graphic information correlated with other graphic information on the document either vertically or horizontally can be detected and retained, while extraneous, uncorrelated pulse groups are deleted. A method and circuit is also disclosed for retaining such correlated pulse groups, even if the group consists of fewer than a minimum number of pulses.

BRIEF DESCRIPTION OF THE DRAWINGS

The invention will be further described in connection with the accompanying drawings, in which.

DETAILED DESCRIPTION OF THE INVENTION

Figure 1:
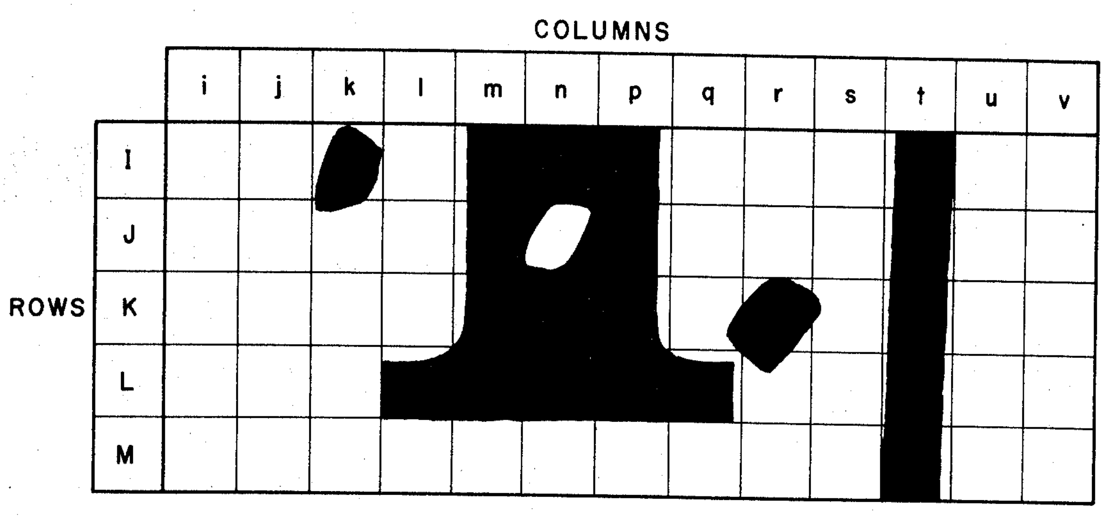
FIG. 1 represents a highly enlarged portion of a typical document bearing black marks of graphic information on a white background.

FIG. 1 shows a highly enlarged portion of a typical document bearing black marks of graphic information on a white background, and overlaid with a grid, including rows I-M and columns *i-v*. The large black area shown may be thought of as the base portion of a typewritten character "i" which has been conveniently aligned with the scanning grid. The rows of the grid represent the path of the scanning beam across the document; the columns represent the successive intervals at which the analog video signal derived by the scanning beam is clocked or sampled to make a binary, black-white, decision; the areas circumscribed by the intersecting rows and columns represent the elemental areas resolved by the facsimile system. The binary signal derived by scanning along row K from column *i* to column *s* will consist to the following sequence of pulses (B stands for black, W stands for white): W W W W B B B W B W.

At elemental areas I,*k* and K,*r* of FIG. 1 are shown small black specks or dots which could have been caused by any of a number of things: for example, they may be due to excessive transfer of pigment to the document during typing operation; they may be particles which fell onto the document or into the light path between the light source and the light detector; they may be pin holes in the document. At J,*n* is a blank, white area within the black base of the letter. This white area may be due to an incomplete transfer of pigment to the document during the printing process; it may be due to a lump of pigment transferred during the printing process to produce a shiny, smooth surface that reflects enough of the scanning light beam to make the area appear as white; it may be a white spatter mark or a speck of dust which has fallen onto the document or into the path of the scanning light beam; it may represent a large breast of noise in the reflected light sensing device or be due to an exceptional large burst of light produced by the light source during the scanning process. Down column *t* is a narrow black vertical line. This line actually may be on the scanned document as a narrow vertical grid line, for example; on the other hand, it may represent a burn on the cathode ray tube of the scanning system, for example, and not graphic information on the scanned document.

Figure 2:
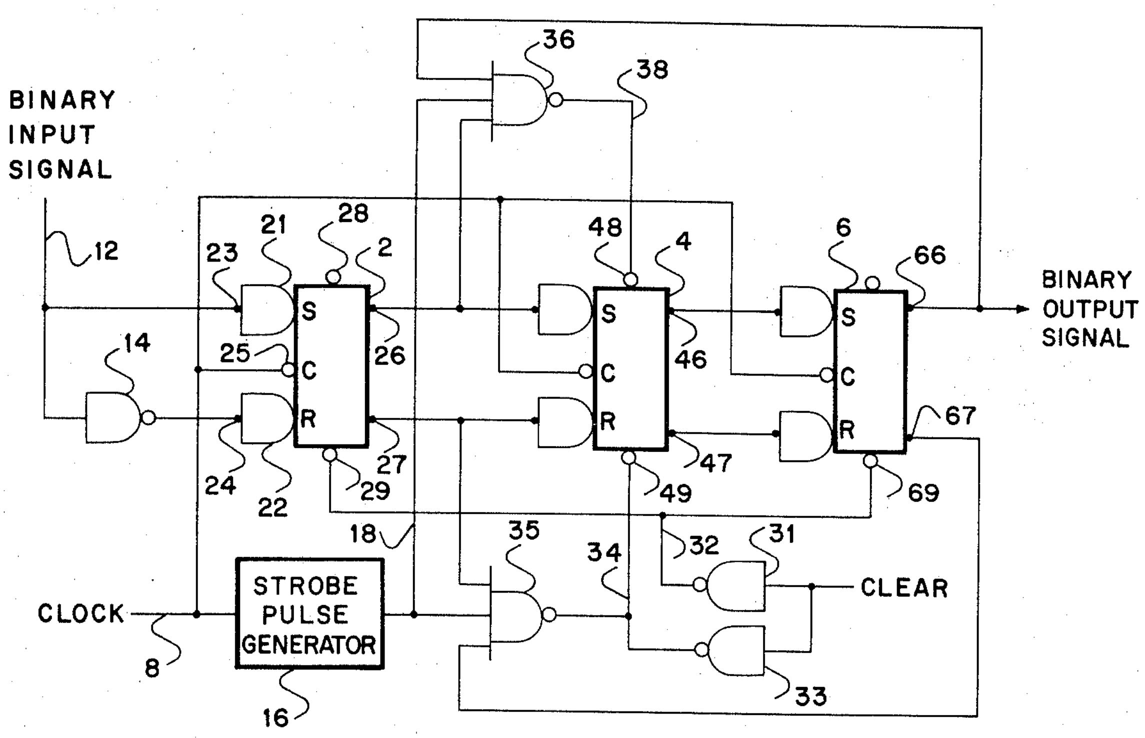
FIG. 2 is a schematic representation of a circuit for eliminating a single, isolated pulse of either value from a group of three binary pulses.

The sequence of black and white representing binary pulses, which may be thought of as a binary data stream, is applied as an input signal to the circuit schematically shown in FIG. 2 together with a clock signal, which may for example be the clock signal used to strobe the video processor and derive the binary signals. The binary pulses proceed in sequence through a series of binary shift registers 2, 4, and 6, each successive pulses being transferred from one shift register to the next on occurrence of a clock pulse applied over a line 8. The shift registers, schematically represented in FIGS. 2 and 3 of the drawing by blocks, are conventional. They may, for example, be transistor circuits designed to operate in the binary mode. Conventionally in binary circuits one of the binary signals, the ZERO signal, is a voltage near zero volts while the other binary signal, the ONE signal, is any voltage greater than some assigned threshold, typically +2 or −2 volts, the voltage amplitude of the binary input signal. Intermediate voltages between these two voltages states do not occur either in the data stream or in the circuits except during transitions.

Preferably, the shift registers are micrologic flip-flop elements which can, for example, be obtained as integrated circuits under the generic type designation 948 from manufacturers such as the International Telephone and Telegraph Corp. or the Fairchild Semiconductor Division of the Fairchild Camera and Instrument Corp. While the operation of these elements are well known to those skilled in this art, typically each such element, for example shift register 2, has input set and reset gates 21 and 22, input signal terminals 23, 24 and 25, and output terminals 26 and 27 (a similar numbering convention will be used for the other shift registers). The shift register is internally structured as two selectively interconnected flip flops operating in a master-slave mode under control of a binary clock signal input applied to input terminal 25 over a line 8. When the clock signal input is in the ONE state, the slave flip-flop controls the output terminals so that the output 26 is always the complement of output 27, and the slave flip-flop is electrically isolated or disconnected from the master flip-flop. Also, during the ONE clock state the master flip-flop is electrically connected to the input set, or AND gate 21 and the input reset AND gate 22, and assumes the state represented by the complementary input signals applied to these gates. When the clock input signal on terminal 25 changes from the ONE state to the ZERO state, the master flip-flop is electrically isolated or disconnected from the input gates and connected to the slave flip-flop, and the state representation of the master flip-flop is transferred to the slave flip-flop and appears at the output terminals after a short delay required by the internal electronic switching operation.

The logic element type 948 also has a pair of asynchronous set and reset terminals 28 and 29 respectively. Whenever a signal at the ZERO level is applied at the set input 28, both master and slave flip-flops are set to the condition causing output 26 to be in the ONE state (set). Whenever a signal at the ZERO level is applied to the reset input 29, both master and slave flip flops are set to the condition causing output 27 to be in the ONE state (reset).

In FIG. 2, the binary input signal on line 12 may be derived as the clock-strobed output signal from a video processor, such as described in U. S. Pat. No. 3,294,896 issued Dec. 27, 1966 to W. R. Young, Jr. It represents, by its binary value, the relative brightness of the successive elemental areas of the scanned document, with conventionally the blacker elemental area being represented by a ONE state and the whiter elemental area by a ZERO state.

Operation of the system starts with a CLEAR pulse supplied by appropriate control circuitry through isolating AND elements 31 and 33, and over lines 32 and 34 to reset input terminals 29, 49, and 69, resetting all of the shift registers 2, 4 and 6 to the white or ZERO output state. The CLEAR pulse precedes the start of the scanning operation by a suitable interval to permit completion of the action initiated by the pulse. As scanning proceeds, the analog video signal produced by the preceding video processor system (not shown) is strobed by the clock signal to produce a sequence of binary data elements, or bits. During or preceding the ZERO state of the first clock cycle following the CLEAR pulse, the first data element of the binary video signal is applied over a line 12 to the set gate 21 and through an inverting AND circuit 14 to the reset gate 22; the ONE state of the clock causes the master flip-flop of shift register 2 to assume a representation of the first data element. When the clock signal falls to ZERO on line 8, the first data element is transferred to the slave flip-flop of the shift register 2 and appears in complementary form at output terminals 26 and 27. During the second clock cycle ONE state, the master flip-flop in shift register 4 assumes the state represented by outputs 26 and 27 while the master flip-flop of shift register 2 assumes the input state determined by the second binary data bit. When the clock falls to ZERO, the first data element appears in complementary form at output terminals 46 and 47 while the second data bit appears at output terminals 26 and 27. During the third clock cycle ONE state, the master flip-flop in shift register 6 assumes the condition represented by the first data bit at terminals 46 and 47, that in shift register 4 takes the second data bit from outputs 26 and 27, and that in element 2 takes the third data bit from the input line. When the clock pulse falls to ZERO to initiate the fourth clock cycle, the first three data bits will be represented on the output terminals of shift register 6, 4 and 2 respectively. Each succeeding clock pulse cycle will cause the data stream to increment or shift each binary video data element one stage further along the shift register chain.

The clock signal is also connected to an input of a strobe pulse generator 16, which may be a NOR gate followed by a delay. The strobe pulse generator produces an output signal on line 18 which is in the ONE state whenever the clock is in the ZERO state, the transitions being delayed somewhat. The purpose of this delay is to allow the other inputs to a NOR gate 35, which my change when the clock goes to the ZERO state, to be properly established in their current states before the output on line 18 reaches the gate activation level.

The NOR gate 35, a logical decision element, receives as its inputs in addition to the strobe pulses on line 18, the outputs of the shift registers 2 and 6 at terminals 27 and 67. These two lines will be in the ONE state whenever the corresponding stage of the shift register contains a white data element. The output on line 34 of the NOR gate 35 will thus fall to the ZERO level during the ZERO level of the clock whenever the data bits preceding and following the bit in shift register stage 4 are white. The signal on line 34 is connected to input 49 of shift register stage 4 and, when the above input conditions to NOR gate 35 exist, cause the shift register 4 to be set to contain a white data element irrespective of whether or not it already contained a white data element. By this connection, then, the NOR gate 35 automatically eliminates black elements when they occur singly. Of course, if the succession of these data elements is already all white, operation of the NOR gate 35 does not affect the data stream.

Suppose that the data changes from a succession of white to a succession of black binary video elements, as occurs along row L of FIG. 1 between columns *k* and l. When the first black bit appears at the output of the shift register 2, the NOR gate 35 will not operate since the signal at output terminal 27 will be ZERO. However, shift register stage 4 already contains the proper white bit, so the data remains correct. During the next clock cycle, the sequence of data in the shift register will represent black-black-white and the ZERO state of the first shift register output at terminal 27 inhibits operation of the NOR gate 35, which prevents deletion of the leading edge transition in the data stream. In the same manner, at the end of a black sequence, the data sequence in the series of shift registers will first be white-black-black then, during the next clock cycle, white-white-black. In both cases, the last shift register output at terminal 67 inhibits operation of the NOR gate 35 and the data sequence is not changed; again, the transition represented by the data sequence is not altered.

The circuit also includes a NOR gate 36 which eliminates single white data elements in a sequence of black data elements, operating in a manner analogous to the NOR gate 35. Specifically, the NOR gate 36 receives as its inputs the output of the strobe pulse generator 16 on line 18 and the shift register outputs 26 and 66. These shift register outputs will both be in the ONE state if the respective shift registers contain black data elements. As a result, the output of the NOR gate 36 on line 38, applied to shift register 4 at input 48, causes the shift register 4 to assume a black data element condition, whether or not it already was in such a condition, and single white data elements between black elements are automatically eliminated. However, should either the first or last shift register represent a white element, the resultant output would prevent operation of the NOR gate 36, and transitions represented by the data sequence would not be altered.

In this fashion the circuit of FIG. 2 cleans up the binary input facsimile signal by identifying and eliminating those bit sequences which, because of the characteristics of the document and of the scanning system, describe areas of the document which are less than the minimum normal elemental area of graphic information. As shown in the drawings, the normal minimum dimension of the scanned characters is on the order of three successive samples of the video signal. Thus, single, isolated bits in the data stream most likely arise from something other than an information area. Since only the actual information area need not communicated, isolated bits may be eliminated from the data stream without appreciably altering the transmitted information. If either the resolution of the scanning system or the normal character size is increased substantially, it well may be possible to eliminate isolated double or triple bit groupings in addition to isolated single bits from the data stream without appreciably altering the communicated information. Eliminating such isolated bit groupings results in a binary output signal having fewer and longer sequences of identical data elements. If these sequences are run length coded, as is often the case in facsimile communication systems, by reducing the number and increasing the length of the successive identical bit sequences in the binary signal, the isolated bit elimination circuit will appreciably enhance the efficiency of the coded communication system. This is a highly desirable advantage achieved by the present invention.

The binary output signal from which isolated bits have been eliminated may be coded in a somewhat different fashion to achieve appreciable coding efficiency. If the series of data elements which constitute the binary output signal is thought of as being divided into a sequence of consecutive word groups, because isolated bits have been eliminated certain words groups now cannot occur in the sequence. For example, assume that the series is divided into a sequence of words in which each consecutive word is formed by the next five bits in the data stream. By eliminating isolated single bits, 16 and 32 possible patterns which could have been formed by a group of five binary elements now cannot occur in the data stream. For example, if the original binary input signal had included the word group sequence 00100, the circuit of FIG. 2 would have changed it to the sequence 00000. Similarly, 15 other binary patterns in the input signal would be changed to sequences in which a bit of one value between bits of the opposite value did not occur. As a result, the binary output signal of FIG. 2 can be grouped into only 16 possible five bit patterns. These 16 patterns each may be uniquely described by the 16 different binary pulse patterns which can be formed by a four bit code word. Thus, simply by eliminating single, isolated bits from the binary facsimile signal and grouping the resulting sequence into five bit words, it is possible to describe the consecutive sequence of five bit words with code words each containing only four bits. This simple coding strategy achieves a 20 percent reduction in the number of bits which need be communicated to describe the original sequence, a highly desirable accomplishment.

Figure 3:
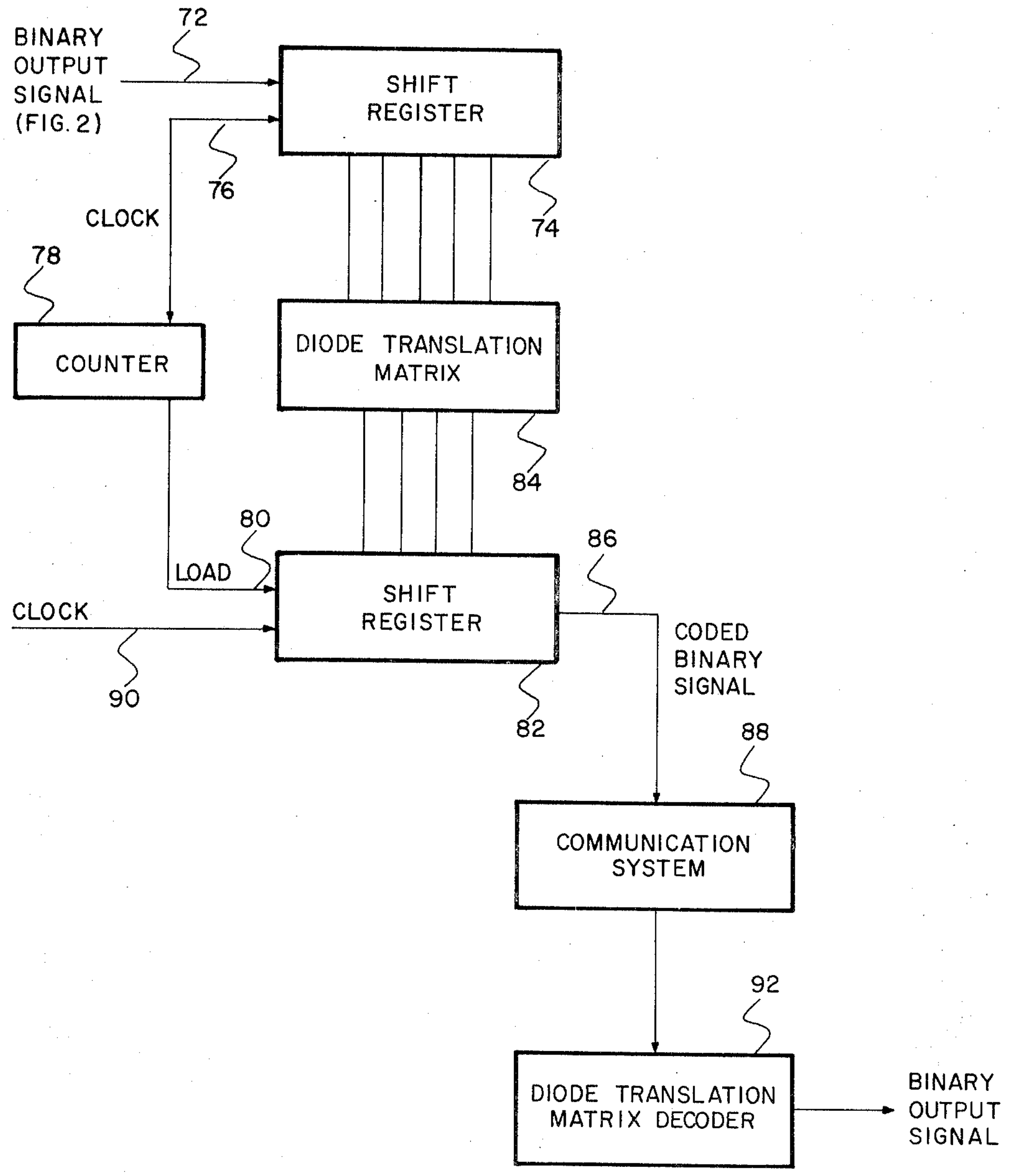
FIG. 3 is a schematic representation of a circuit for coding the pulse sequences issuing from the circuit of FIG. 2.

In FIG. 3 is illustrated a circuit for converting and communicating the binary sequence of bits issuing from the circuit of FIG. 2. While the binary sequence could be accepted as consecutive groups of any desired number of bits, since groups of five bits convert evenly into code words of four bits, such a grouping and conversion is employed by the coding system shown. The binary data output signal produced by the circuit of FIG. 2 is supplied over a line 72 to a five stage shift register 74 together with its associated clock signal on a line 76, the clock signal marking the occurrence of each output pulse for a counter circuit 78. As is conventional with shift registers, reception of each successive clock pulse together with its associated data bit or pulse causes all preceding pulses to be shifted one stage along the register, the pulse stored in the last stage being lost in the process. After each fifth data and clock pulse has been supplied to the shift register 74 and to the counter 78, the counter 78 produces an output signal on line 80. This signal is applied to a four stage shift register 82, causing it to parallel load the four bit pattern produced by a diode translation matrix 84 in accordance with the five bit pattern then held in the shift register 74. Construction of such a diode matrix for translating one of 16 possible five bit patterns into one of 16 possible four bit patterns is straightforward, and is described for example by R. K. Richards in his book Arithmetic Operations in Digital Computers published by Van Nonstrand Company of New York in 1955. In response to another clock signal on line 90, the binary pulse pattern in the four stage shift register 82 is supplied sequentially over a line 86 to a communication system 88, such as a telephone line. The clock signal on line 90 occurs at four-fifths the rate pulses are supplied to the five stage shift register 74, achieving a 20 percent reduction in the number of symbols which need be communicated to describe the binary output signal produced by the circuit of FIG. 2. At the receiver the reverse process occurs, each successive code word of four pulses received from the communication system being translated by a similar diode translation matrix decoder 92 into a five bit pulse pattern, the pulse patterns being shifted from a shift register in response to a clock signal at five-fourths the rate the code word pulses are being received. Since this coding scheme will always produce four code pulses for each group of five data elements from which single bits have been eliminated, it may proceed in synchronism with a constant speed line scanning operation, the data rate and communication rate being directly tied to one another as previously noted.

While the circuit of FIG. 3 has been presented as accepting the binary output produced by the circuit of FIG. 2, it could have operated instead on the binary input signal, for the diode translating matrix also may perform the single bit elimination function as well, if desired. Since the diode translating matrix 84 converts five bit patterns into four bit patterns, to eliminate isolated data bits from the input signal in the conversion process, all it need to is translate five bit patterns with isolated bits into the four bit patterns which represent them without isolated bits. For example, the five bit pattern 00100 would be translated into the same four bit pattern as 00000, thereby eliminating the isolated bit in the process. Of course, the diode matrix could also be used to perform only the isolated bit elimination function, translating 00100 into 00000 for example to replace the shift register in the circuit of FIG. 2 if desired.

Of the sixteen possible five symbol groups which can issue from the circuit of FIG. 2, some of the groups will include an isolated 0 or 1 as the last bit received. Since such bits would have been eliminated by the circuit of FIG. 2 had they in fact been isolated, it is clear that should the last bit entered into the five bit shift register be different from the bit which preceded it, the next bit received must be of the same value as the last bit. To further improve the coding efficiency of the system, the counter 78 in such cases may be set to count the next six pulses before producing an output, thereby permitting the pulse following the isolated last pulse of the previous word groups to be lost since its value is already known. The reverse process then would be preformed at the decoder on the received signal, generating an additional bit whenever the last bit of the group described by the received code word is different than the preceding bit. However, since the occurrence of such isolated bits will happen at random intervals, if this process is used the communication system now cannot be operated in synchronism with the scanning system. Either the scanning system or the coding system will have to be operated at a variable rate, or some buffering must be provided between the two.

Because of the elimination of isolated bits from the binary input signal, the resulting five bit word groups in the binary output signal will have a substantially increased probability of occurrence. For example, the pulse sequence of 00000 now will be produced if an isolated one occurred in any of the intermediate three positions of the group, or in both the second and fourth positions of the group. Because of this increase probability of certain five bit groups, to further increase the efficiency of the coding system the 16 possible five bit groups in the binary output signal of FIG. 2 may be translated according to a Huffman coding strategy into code words having different numbers of symbols, the number of symbols in each code word being related to the probability of occurrence of the five bit group it designates. However, such a translation or coding scheme again will not permit synchronous operation of the scanning and communication system. Either a variable scanning rate must be employed or buffering must be added to the coding and decoding systems if the code words are to be communicated at a constant rate without interruption.

As was previously noted, the pulses forming the binary output signal in FIG. 2 could have been divided into groups of more or less than five bits. Some simple calculations will quickly show that larger bit groupings will contain proportionately greater numbers of groups with isolated bits, and proportionately fewer without at least one isolated bit, as the following table shows:

| Number of bits in group | 5 | 6 | 7 | 8 | 9 | 10 |
|---|---|---|---|---|---|---|
| Total number of groups | 32 | 64 | 128 | 256 | 512 | 1024 |
| Groups with isolated bit | 16 | 38 | 86 | 188 | 402 | 846 |
| Groups without isolated bit | 16 | 26 | 42 | 68 | 110 | 178 |

If very long groupings are used, it can be shown that the greatest possible compression, a logrithmic function, for a given sequence of message symbols from which single isolated bits have been eliminated will require only about seven-tenths as many code symbols as message symbols. Of course, eliminating double or triple bit groupings as well will further increase the maximum possible coding compression. This is indeed an important advantage of the coding system just described.

While the circuit represented in FIG. 2 will correctly delete the isolated data elements representing the specks of dust or the like shown at Ik and Kr in FIG. 1, it will also result in erasure of the portion of the character represented along row J. The data elements along row J from column to $q$ will represent, in sequence, white, black, white, black, white. When the first three elements have been shifted into shift registers 6, 4 and 2 respectively of FIG. 2, the NOR gate 35 will receive two of its requisite input signals from the shift register outputs 27 and 67. The strobe pulse applied over line 18 therefore will cause the NOR gate 35 to produce an output signal which is applied to shift register 4 to change the data element it contains from representing black to white. Thus the first white, black, white sequence, representing elemental areas Jl, Jm, and Jn, will be changed to an all white sequence by the circuit shown in FIG. 2. In a similar fashion the last white, black, white sequence, representing elemental areas Jn, Jp, and Jq, will also be changed to an all white sequence, and the portion of the character along row J will be completely erased. To prevent this erasure, another shift register could be added to the chain shown in FIG. 2, and the NOR gate 35 completely shifted one register downstream and storbed after the NOR gate 36. If these changes were made, the NOR gate 36 would first check the data element sequence for a black, white, black condition, and change the middle white representing element to black, before the shifted and delayed NOR gate 35 checked for a white, black, white sequence. In this fashion the change to black would take precedence, and the white data element representing Jn would be changed to black. The body portion of the character along row J not only would be retained, but the white center speck would be changed to black. However, this similar change would be made at Il, Kq, and Ks to erroneously extend the black body portion of the character. To prevent such extensions, it is desirable to delete single black data elements whenever they occur, but to delete single white data elements only when preceded and followed by at least two black data elements. A circuit for accomplishing this is represented in FIG. 4.

Figure 4:
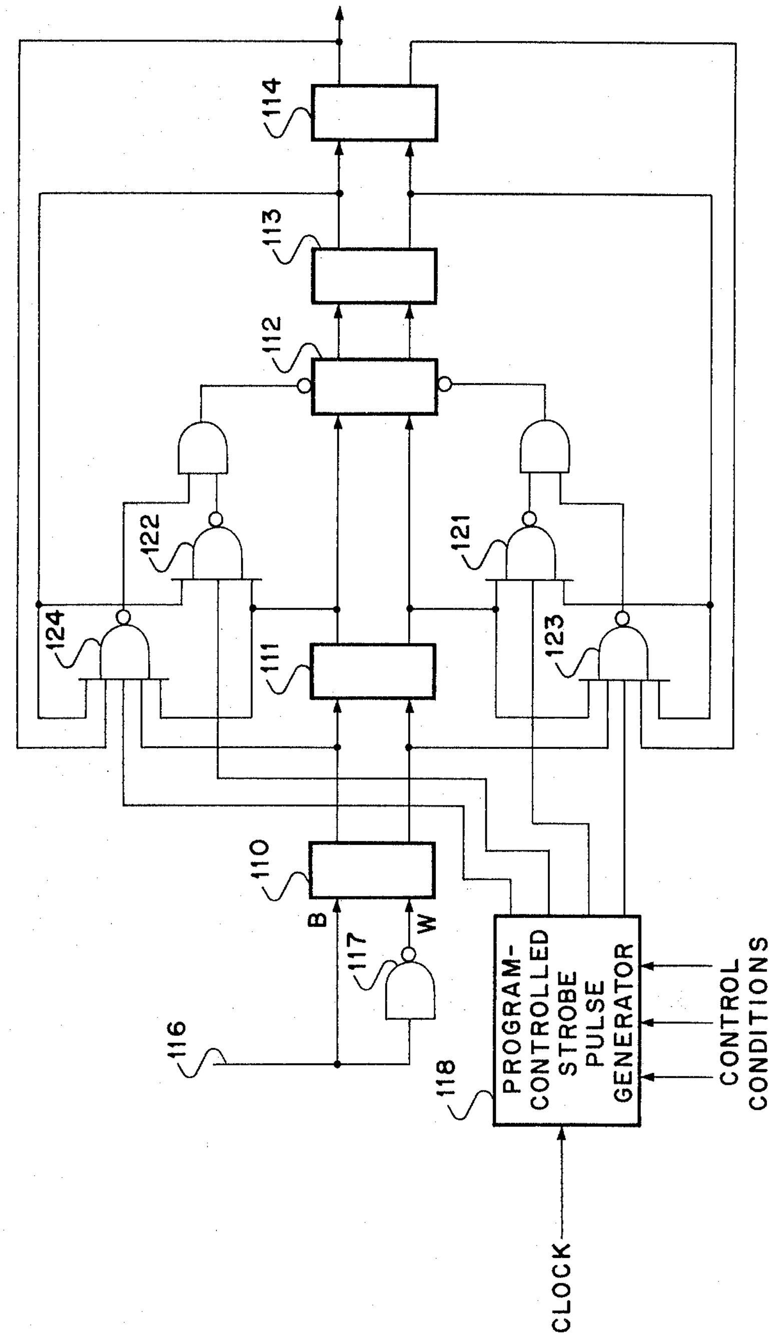
FIG. 4 is a schematic representation of a circuit for eliminating certain single, isolated pulses of either value from a group of five binary pulses as predetermined by certain control conditions.

In FIG. 4 is schematically represented the basic elements of a system for eliminating certain, single isolated pulses from a binary sequence of five pulses. The elements include shift registers 110, 111, 112, 113 and 114. As in the system schematically shown in FIG. 2, the binary input signal is applied over a line 116 directly to one input of the shift register 110, and after inversion in AND circuit 117, to the other input of the shift register 110. Thus, a black representing pulse will appear as a ONE signal at the top outputs of the shift registers and a ZERO signal at the bottom outputs of the shift registers; conversely a white representing pulse will appear as a ZERO at the top outputs of the shift registers and a ONE signal at the bottom outputs of the shift registers. Conversion of a data element may occur in shift register 112. Clock pulses are applied to a program-controlled strobe pulse generator 118, together with certain control condition input signals. The control condition input signals may result from a manual operation, such as actuating a switch, performed by the operator of the system after first examining the document from which the data elements are derived; they may be produced automatically by other components of the system upon sensing certain conditions. For example, the operator may note some halftone areas or fine vertical lines on the document which should not be deleted, and by operation of a switch apply an input signal to the strobe pulse generator to disable partial or complete operation of the circuit; the video processor may sense a very strong, even though short, black or white signal, and apply a momentary and appropriately delayed input signal to the strobe pulse generator to prevent its deletion.

Should the requisite data and control conditions coincide, selected data elements will be changed in the shift register 112. To this end, the circuit includes a NOR circuit 121 which receives as its inputs and responds to a white data representation in shift registers 111 and 113, and to a signal from the strobe pulse generator 118, to insure that the data element in shift register 112 also represents white. This circuit also includes a NOR circuit 122 which receives as its inputs a black data representation in shift registers 111 and 113 together with a signal from the strobe pulse generator 118, and responds to the coincidence of these signals to insure that the data element in shift register 112 also represents black. In a similar fashion, NOR circuit 123 includes as its inputs a white data representation in shift registers 110, 111, 113, and 114 together with a pulse from the strobe pulse generator 118, and responds to the coincidence of these conditions to insure that the data element and the shift register 112 also represents white. Also, the circuit includes a NOR circuit 124 which includes as its inputs a black data representation in shift registers 110, 111, 113, and 114 together with a signal from the strobe pulse generator 118, and responds to the coincidence of these signals to insure that the data element in the shift register 112 also represents black.

By selective actuation of the NOR gates 121, 122, 123 and 124 by the strobe pulse generator, in response to the control conditions, it is possible to be quite selective in the modifications imposed on the data stream by the system. For example, single white elements isolated between black elements may always be deleted, but single black elements only deleted when preceded and followed by at least two white elements. However, even with such a selective deletion capability, the system still would delete most if not all of a fine vertically oriented line, such as shown in FIG. 1 running down column t. It is possible to retain such vertically correlated areas using a circuit such as shown in FIG. 4 by a simple modification of the original data element representation sequence. Specifically, if the elements of the data stream supplied to the circuit shown in FIG. 4 were paired or otherwise correlated to convey a horizontal continuum of vertically adjacent areas on the document, such as Kp, Lp, Kq, Lq, Kr, Lr, Ks, Ls, Kt, Lt, Ku, Lu, etc., then vertically correlated black areas would be represented by adjacent black data elements such as at Kt, Lt, and horizontally correlated black areas would be represented by black but separated data elements such as Lp and Lq separated by Kq. In either case, by only erasing black representing data elements separated by two or more white data elements, both horizontally and vertically correlated black areas will be retained in the data stream, while uncorrelated black areas such as at Ik will be automatically erased. Since slanted rising black lines across the scan path also would be represented in the postulated data stream by successive black data elements (for example, if the vertical line in column *t* were instead rising at a 45° angle through areas Lt and Ku, then these successive data elements would represent black), they too would not be erased by a circuit such as the one shown in FIG. 4. However, slanted and falling thin black lines in a white area would be separated by two white data elements. They, too, may be automatically detected and retained by a circuit, similar to those illustrated, which modifies black data elements only if preceded or followed by at least three white data elements.

The postulated data element sequence, a horizontal continuum of vertically adjacent areas on the document may be derived by simply wobbling the scanning light beam to view the successive areas in the desired pattern. Alternately, each successive horizontal line may be separately scanned, and the data elements stored in a memory then read from memory and interleaved with the data elements for the next horizontal line to form the postulated data sequence. After appropriate modification in the disclosed circuits, the data sequence for each horizontal scan line may be isolated simply by sampling every other data element in the interleaved sequence.

While preferred embodiments of the invention, including both the method and circuit for identifying and eliminating isolated data elements, and for coding the resultant signal, have been illustrated and described, since different implementations of the invention may be preferred by others, and since modifications will naturally occur to those skilled in this art, the invention should not be circumbscribed by the disclosed embodiments but rather should be viewed in light of the following claims.

I claim:

1. A method for altering a data stream consisting of a sequence of pulses that includes pulses representative of brightness values along one horizontal area on the document interleaved with pulses representative of brightness values along a vertical adjacent horizontal area on the document, the method including the steps of accepting successive groups of pulses, the number of pulses in an accepted group exceeding by at least one the number of pulses required to represent a minimum normal elemental area of brightness value information, comparing the interleaved pulses to detect pulse patterns representative of vertically and horizontally adjacent pulses fewer in number than required to represent the minimum normal elemental area of brightness value information, transforming those accepted groups which present a predetermined pulse pattern of detected fewer pulses than said minimal number into groups which represent a pattern from which the information represented by the pulses fewer in number than said minimum is deleted, and providing a sequence of output pulse groups representative of the accepted pulse groups and including the transformed pulse groups in place of those groups which present the predetermined pulse pattern.

2. A facsimile noise reducing system operative to convert a first sequence of binary symbols representing indicia on a document into a second sequence of binary signals in which isolated binary symbols, according to predetermined patterns, are converted to the opposite binary symbol type, said system comprising:

means for receiving said first sequence of binary symbols representative of reflectivity characteristics of a document scanned by facsimile processes;

means for converting first and second binary symbol types to opposite types in said first symbol sequence in predetermined binary symbol patterns representing isolated document reflectivity characteristics adjacent to document areas of an opposite reflectivity characteristic;

said converted first symbol sequence having predetermined symbol combinations as impossible combinations; and means for forming said converted first symbol sequence into said second symbol sequence.

3. A facsimile noise reducing system for coding a first sequence of binary signals representing document indicia into a second sequence of binary signals in which isolated binary symbol information is deleted, said system comprising:

means for receiving said first sequence of binary symbols representative of document indicia;

means for converting one or more binary symbols in said received first sequence to contrasting document characteristic representing binary symbols in cases where said one or more binary symbols represent identical document reflectivity characteristics in one or more elemental areas adjacent to other elemental areas of opposite reflectivity characteristics in a predetermined pattern around said one or more elemental areas;

means for grouping said first sequence of symbols with said converted symbols into sequential groups;

means for transforming each said group of symbols into a further group of generally lesser numbers of symbols in which all possible combinations of binary symbols in each of said first groups is uniquely represented by a corresponding combination of symbols in a further group of fewer numbers of symbols; and means for combining said further groups of fewer numbers of symbols into said second sequence of symbols.

4. The system of claim 3 wherein one or more bits of a first type are converted when two or more bits of the second type occur on either side in said first sequence and one or more bits of said second type are converted when one or more bits of the first type occur on either side in said first sequence.

5. A facsimile noise reducing system for coding a first sequence of binary signals representing document indicia into a second sequence of binary signals in which isolated binary symbol information is deleted, said system comprising:

means for receiving said first sequence of binary symbols representative of document indicia;

means for converting one or more binary symbols in said first sequence to contrasting document characteristic representing binary symbols in cases where said one or more binary symbols represent document reflectivity characteristics in one or more elemental areas adjacent to other elemental areas of opposite reflectivity characteristics in a predetermined pattern around said one or more elemental areas;

means for grouping said first sequence of symbols with said converted symbols into first sequential groups each having a predetermined number of symbols;

means for translating said first groups of symbols into second groups of symbols having fewer number of symbols in each group and where each combination of symbols possible in said second group defines all possible combinations of symbols for each of said first groups except predetermined isolated terminal symbols in said first group;

said isolated terminal symbols being indication of a similar isolated terminal symbol in an adjacent group in accordance with the symbol converting scheme; and means for combining said second groups of symbols to form said second sequence of symbols.

6. A facsimile noise reducing system operative to convert a first sequence of binary symbols representing indicia on a document into a second sequence of binary signals in which isolated binary symbols, according to predetermined patterns, are converted to the opposite binary symbol type, said system comprising:

means for receiving said first sequence of binary symbols representative of reflectivity characteristics of a document scanned by facsimile processes;

means for detecting isolated first and second binary symbol types representing isolated minimal document reflectivity characteristics adjacent to document areas of an opposite reflectivity characteristic;

means for converting detected, isolated first and second binary symbol types to opposite types in said first symbol sequence to provide a converted first symbol sequence having predetermined symbol combinations occurring in said unconverted first sequence deleted from said converted first symbol sequence; and means for translating said converted first symbol sequence into said second symbol sequence having fewer numbers of symbols and providing a unique correspondence between symbol combinations in said second symbol sequence and symbol combinations in said converted first symbol sequence.

7. The system of claim 6 in which said detecting means detects different predetermined symbol patterns for converting first and second symbol types in said first symbol sequence.

8. The system of claim 6 wherein the document elemental area represented by a single binary symbol is at a greater resolution than necessary for intelligible facsimile reproduction.

9. A system for eliminating noise and minimal information representing symbols in a binary symbol sequence produced by the facsimile scanning of a document, said system comprising:

means for examining said binary symbol sequence in five or more symbols at a time;

means for detecting one or more examined symbols of a first symbol type surrounded by a plurality of symbols of a second type;

means for converting said detected symbols of said first type to said symbols of said second type;

means for detecting one or more symbols of said second type in said group of examined symbols surrounded by a plurality of symbols of said first type;

means for converting said detected symbols of said second type to said symbols of said first type; and means for transforming said converted sequence of symbols into a further sequence of symbols uniquely representing the sequence of converted symbols in lesser numbers of symbols than said first sequence.

10. The system of claim 9 wherein said means for detecting said isolated first symbols and said means for detecting said isolated second symbols are adapted to detect different symbol patterns.

11. A system for eliminating predetermined information patterns from a binary symbol sequence representative of the scanned signals developed from a document during facsimile processes, said system comprising:

means for detecting transitions between first and second symbol types in said binary symbol sequence and adapted to detect adjacent first and second transitions separated by less than a minimum number of consecutive, identical adjacent binary symbols necessary to provide predetermined facsimile resolutions;

means for eliminating said detected first and second transitions in said binary symbol sequence;

the elimination of said detected first and second transitions reducing the number of possible binary symbol combinations in said binary symbol sequence; and means for converting said binary symbol sequence with the eliminated transitions into a further binary symbol sequence of lesser numbers of symbols and having a unique correspondence between predetermined binary symbol combinations in said further sequence and the possible combinations of binary symbols in said first mentioned sequence.

12. The system of claim 11 wherein the one or more identical binary symbols separating said first and second transitions represent reflectivity characteristics of nonlinearly arranged elemental areas of said document.

13. A facsimile system which describes graphic information contained in successive elemental areas of a document by a binary data stream consisting of a sequence of pulses, successive pulses representing the brightness value of adjacent elemental areas of the document in both a horizontal and vertical direction, a plurality of successive pulses of a first type constituting a minimum normal elemental area of graphic information of the first brightness value on the document, the system including a circuit having, in combination:

means for accepting successive groups of pulses representing brightness values of adjacent elemental areas in both a vertical and horizontal direction, the number of pulses in an accepted group exceeding by at least one pulse the number of pulses required to represent the minimum normal elemental area of graphic information;

first means for transforming accepted groups which include fewer than the number of successive pulses of the first type required to represent the minimum normal elemental area of graphic information into groups which do not include pulses representative of less than the normal elemental area;

second means for transforming accepted groups which include fewer than the number of successive pulses of the second type required to represent the minimal normal elemental area of graphic information into groups which do not include pulses representative of less than the normal elemental area;

means for providing successive output pulse groups representative of the accepted successive groups and including the first and second transformed groups in place of those groups which include pulses representing less than the minimum normal elemental area;

first means for producing a first output signal when fewer than the number of successive pulses, in both horizontal and vertical directions, of the first type required to represent the minimum normal elemental area of the first brightness value occur in the accepted group;

second means for producing a second output signal when fewer than the number of successive pulses of the second type required to represent the minimal normal elemental area of the second brightness value occur in the accepted group;

first circuit means operative in response to the first output signal for ensuring that at least the intermediate pulses within the accepted group are of the first type; and second circuit means of in response to the second output signal for ensuring that at least the intermediate pulses within the accepted group are of the second type.

14. A facsimile system as set forth in claim 13 in which the binary data stream includes pulses representative of brightness values along one horizontal area on the document interleaved with pulses representative or brightness values along a vertically adjacent horizontal area on the document, said first circuit means comparing said interleaved pulses to determine vertical and horizontal adjacency.

* * * * *